US010556575B2

(12) United States Patent
Boulivan

(10) Patent No.: US 10,556,575 B2
(45) Date of Patent: Feb. 11, 2020

(54) BRAKING SYSTEM

(71) Applicant: AGCO International GmbH, Neuhausen (CH)

(72) Inventor: Guillaume Boulivan, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 184 days.

(21) Appl. No.: 15/552,086

(22) PCT Filed: Feb. 29, 2016

(86) PCT No.: PCT/EP2016/054246
§ 371 (c)(1),
(2) Date: Aug. 18, 2017

(87) PCT Pub. No.: WO2016/139182
PCT Pub. Date: Sep. 9, 2016

(65) Prior Publication Data
US 2018/0029578 A1  Feb. 1, 2018

(30) Foreign Application Priority Data

Mar. 4, 2015  (EP) .................................. 15290058

(51) Int. Cl.
*B60T 11/10*  (2006.01)
*B60T 11/21*  (2006.01)
*B60T 13/08*  (2006.01)
*B60T 13/66*  (2006.01)
(Continued)

(52) U.S. Cl.
CPC ............. *B60T 11/101* (2013.01); *B60T 11/21* (2013.01); *B60T 13/662* (2013.01); *B60T 13/686* (2013.01); *B62D 11/08* (2013.01)

(58) Field of Classification Search
CPC ........ B60T 11/101; B60T 11/08; B60T 11/21; B60T 11/22
See application file for complete search history.

(56) References Cited

U.S. PATENT DOCUMENTS 3,120,244 A   2/1964  Hahn
3,640,067 A   2/1972  Ingram
(Continued)

FOREIGN PATENT DOCUMENTS

DE   3242982 A1   5/1984
EP   1366652 A2   12/2003
(Continued)

OTHER PUBLICATIONS

European Patent Office, International Search Report for Parent International Application No. PCT/EP2016/054246, dated Jun. 15, 2016.
(Continued)

*Primary Examiner* — Thomas J Williams
*Assistant Examiner* — James K Hsiao

(57) ABSTRACT

A low-pressure vehicle braking system and method of operation that controls the supply of brake fluid based on the pressure differential between left and right master cylinders associated with the different wheel brakes allowing for pressure harmonization between the left and right wheel brake circuits and a brake system module suitable for installation on an existing vehicle.

13 Claims, 5 Drawing Sheets

(51) Int. Cl.
*B60T 13/68* (2006.01)
*B62D 11/08* (2006.01)

(56) References Cited

U.S. PATENT DOCUMENTS

| | | | | |
|---|---|---|---|---|
| 4,236,759 | A | * 12/1980 | Lysenko | B60T 11/323 |
| | | | | 137/519.5 |
| 4,402,478 | A | * 9/1983 | Martin | B60T 8/1703 |
| | | | | 188/16 |
| 4,475,773 | A | * 10/1984 | Bartscher | B62D 11/08 |
| | | | | 188/16 |
| 4,898,078 | A | * 2/1990 | Gage | E02F 9/2217 |
| | | | | 303/9.61 |
| 4,953,917 | A | 9/1990 | Wittich | |
| 5,531,512 | A | * 7/1996 | Thompson | B60T 13/686 |
| | | | | 188/151 A |
| 6,592,190 | B2 | * 7/2003 | Dunbar | B60T 13/16 |
| | | | | 303/7 |
| 7,178,884 | B2 | * 2/2007 | Vandendriessche | A01D 69/10 |
| | | | | 180/900 |

FOREIGN PATENT DOCUMENTS

| | | |
|---|---|---|
| GB | 2139720 A | 11/1984 |
| GB | 2476036 A | 6/2011 |
| WO | 2006103049 A1 | 10/2006 |
| WO | 2007/131758 A1 | 11/2007 |
| WO | 2008001208 A1 | 1/2008 |
| WO | 2009090078 A2 | 7/2009 |
| WO | 2011/010245 A1 | 1/2011 |

OTHER PUBLICATIONS

UK Intellectual Property Office, International Search Report for related UK Application No. GB1504654.3, dated Sep. 21, 2015.

* cited by examiner

BRAKING SYSTEM

BACKGROUND OF THE INVENTION

Field of the Invention

The present invention relates to a braking system for a vehicle, in particular a braking system having separate brake pedals for actuation of separate wheel brakes.

Description of Related Art

In some vehicles, and in particular for agricultural vehicles such as tractors, separate brake pedals may be provided for the separate actuation of wheel brakes of the vehicle, for a brake pedal for actuating the brake on the right rear wheel being on the right side of the tractor chassis for engagement by the right foot of the operator, and the brake pedal for operating the brake on the left rear wheel being on the left side of the chassis for operation by the left foot of the operator. While both brakes may be actuated at the same time to stop the vehicle, selective actuation of the separate brakes allows for greater control of the vehicle turning circles.

It is known to arrange the left and right brake pedals to drive respective master cylinders, wherein each master cylinder forms a hydraulic circuit with a respective slave cylinder arranged to drive the respective left and right wheel brakes. However, the use of such separate hydraulic circuits for the operation of the separate left and right wheel brakes prevents pressure harmonisation between the braking circuits, which can lead to an uneven braking response or brake feel between the left and right brake pedals.

The prior art braking system shown in GB 2476036 A seeks to boost the brake pressure by use of a central brake fluid supply. However, in this system the master cylinders are used to drive shift valves of the slave cylinders, to control the boosted supply of brake fluid to the slave cylinders. Accordingly, brake responsiveness can be impacted, leading to a dead stroke feeling in the use of the master cylinder pedals, before the activation of the slave cylinders.

It is an object of the invention to provide a braking system to address the above issues.

SUMMARY OF THE INVENTION

Accordingly, there is provided a braking system for an agricultural vehicle, preferably a hydraulic braking system, the braking system comprising
 a first master cylinder associated with a first brake pedal to control a left wheel brake, and
 a second master cylinder associated with a second brake pedal to control a right wheel brake,
 wherein brake fluid from a brake fluid supply is selectively supplied to the left wheel brake, the right wheel brake, or both the left and right wheel brakes, based on the difference between the first master cylinder pressure and the second master cylinder pressure.

As the supply of brake fluid to the left and right brakes can be linked to the pressure differential between the first and second master cylinders, the braking system provides for a pressure harmonisation between the left and right brakes, which can be based on the operator pressure applied to the associated left and right brake pedals. It will be understood that the respective left and right wheel brakes are provided with respective first and second slave cylinders to receive the applied brake fluid, and to convert the applied pressure into a braking force applied to the respective wheel brakes.

It will be further understood that the brake fluid may be from a pressurised or boosted brake fluid supply, to provide for an increased brake pressure and an improved braking response time. In addition, utilising a pressurised or boosted brake fluid supply to apply braking force means that smaller master cylinders can be used in the braking system.

Preferably, the system comprises a central selection valve to selectively apply brake fluid from a brake fluid supply to the left wheel brake, to the right wheel brake, or to both the left and right wheel brakes, wherein the operation of the central selection valve is based on the difference between the first master cylinder pressure and the second master cylinder pressure.

The use of a central selection valve allows for a balancing of the pressure between the left and right wheel brakes, based on the level of actuation of the left and right brake pedals.

Preferably, the first master cylinder pressure is used to drive a first side of the central selection valve, and the second master cylinder pressure is used to drive an opposed second side of the central selection valve. However, it will be understood that any suitable differential pressure valve may be used, which is operable to route brake fluid to the left and/or right brakes, based on the pressure differential between the master cylinders.

Preferably, the central selection valve is configured wherein:
 when the first master cylinder pressure is substantially greater than the second master cylinder pressure, brake fluid is supplied to the left wheel brake,
 when the first master cylinder pressure is substantially less than the second master cylinder pressure, brake fluid is supplied to the right wheel brake, and
 when the first master cylinder pressure is substantially equal to the second master cylinder pressure, brake fluid is supplied to both the left wheel brake and the right wheel brake.

If the operator only actuates one of the brake pedals, accordingly the brake fluid is supplied to the wheel brake associated with that pedal. If the operator actuates both pedals, accordingly brake fluid is supplied to both brakes, as a combined braking action is desired by the operator. As these braking operations are linked via a central valve, the pressure harmonisation across the braking system is ensured.

In a preferred aspect, the central selection valve is provided with at least one biasing spring to bias the central selection valve towards the state where brake fluid is supplied to both the left wheel brake and the right wheel brake. It will be understood that the biasing strength of the at least one biasing spring may be selected to return the valve to the at-rest position of supplying brake fluid to both brakes, and/or to provide a suitable damping effect to the operation of the central selection valve.

Preferably, a first biasing spring is applied to the first side of the central selection valve, and a second biasing spring is applied to the opposed second side of the central selection valve.

Preferably, the system further comprises a brake fluid reservoir or tank, wherein the central selection valve is configured such that:
 when the first master cylinder pressure is substantially greater than the second master cylinder pressure, the right wheel brake is substantially drained to the brake fluid reservoir, and when the first master cylinder pressure is substantially less than the second master cylinder pressure, the left wheel brake is substantially drained to the brake fluid reservoir.

As brake fluid is supplied to one of the wheel brakes, the other of the wheel brakes may be allowed to drain to the brake fluid reservoir, ensuring that an adequate level of brake fluid remains in circulation in the braking system, and allowing for further pressure harmonisation.

Preferably, the system comprises an external brake fluid supply, preferably a pressurised brake fluid supply from a brake fluid reservoir. Preferably, the brake fluid supply comprises an accumulator. The accumulator provides a pressurised supply reserve of brake fluid for use in the system.

Preferably, the system is arranged where brake fluid from the brake fluid supply is supplied to the central selection valve when the pressure of the first and second master cylinders is above a threshold value.

Preferably, the system further comprises a central proportional valve to supply brake fluid from the brake fluid supply to the central selection valve, wherein the operation of the central proportional valve is controlled by the pressure of the first and second master cylinders.

Preferably, the central proportional valve is configured wherein:
  when the pressure of the first and second master cylinders is greater than an upper threshold value, brake fluid is supplied via the central proportional valve to the central selection valve; and
  when the pressure of the first and second master cylinders is less than the upper threshold value, brake fluid is not supplied via the central proportional valve to the central selection valve.

In an additional aspect, preferably the first master cylinder is fluidly coupled with the left wheel brake, preferably with a first slave cylinder coupled to the left wheel brake, and the second master cylinder is fluidly coupled with the right wheel brake, preferably with a second slave cylinder coupled to the right wheel brake.

Preferably, the first master cylinder is fluidly coupled with an auxiliary piston of the first slave cylinder of the left wheel brake, and the second master cylinder is fluidly coupled with an auxiliary piston of the second slave cylinder of the right wheel brake, such that the first and second master cylinders can drive the left and right wheel brakes respectively through actuation of the auxiliary pistons.

As the master cylinders may be also connected to the respective wheel brakes directly, as least a portion of the pressure generated by use of the master cylinders may be used to drive brake cylinders associated with the wheel brakes. In this case, the master cylinder fluid may be used as an auxiliary brake fluid supply, in addition or as an alternative to the brake fluid from the central brake fluid supply. Such an auxiliary brake fluid may be used to apply a relatively small braking force to the respective left and right wheel brakes, for states where the pressure of the first and second master cylinders is less than the threshold value for actuation of the central proportional valve to direct the brake fluid from the brake fluid supply to the wheel brakes, e.g. during gentle braking operations. In addition, if the external supply pressure fails, the auxiliary supply from the master cylinders may be used to actuate brake cylinders to brake the vehicle.

Further preferably, the central proportional valve is configured wherein:

when the pressure of the first and second master cylinders is less than the upper threshold value and greater than a lower threshold value, brake fluid is prevented from flowing through the central proportional valve; and
  when the pressure of the first and second master cylinders is less than the lower threshold value, brake fluid is allowed to drain through the central proportional valve to a brake fluid reservoir.

In embodiments where the master cylinders are coupled to slave cylinders, accordingly when the slave cylinders are actuated, the master cylinder pressure seen by the central proportional valve will drop. As a result, the central proportional valve may return from its fully actuated position, due to reduced pressure. While the brake pedal or pedal may still be applied by an operator, the valve is preferably configured to have a central non-return state, wherein if the pressure falls below an initial actuation pressure level, but remains above a baseline actuation pressure level, the pressurised brake fluid supplied to the slave cylinders is retained in the cylinders to maintain the braking force applied. If the pressure falls further below the baseline actuation pressure level, indicating that the master cylinders are no longer actuated, the valve is configured to allow the pressurised brake fluid to drain from the slave cylinders.

Preferably, the system further comprises a shuttle valve driven by the first master cylinder pressure and the second master cylinder pressure, wherein the central proportional valve is driven by the output of the shuttle valve.

By providing a shuttle valve, the higher pressure of the first and second master cylinders can be used to actuate the central proportional valve.

Preferably, the output of the shuttle valve is used as the input for a trailer brake system.

As the shuttle valve may be used to indicate that a general braking action is being applied by an operator, it can also be used to supply a trailer brake for a trailer coupled to the vehicle.

Preferably, the system further comprises a front brake system, wherein an input to a front brake system is based on a combination of the first master cylinder pressure and the second master cylinder pressure.

When operator pressure is applied to both the brake pedals, and corresponding pressure is generated in both master cylinders, the front brake system is actuated to apply a braking pressure to the front brakes of the vehicle.

Preferably, the system comprises a valve arranged to produce an output for a front brake system, when the valve is driven by pressure at both the first master cylinder and the second master cylinder. The valve is preferably an "AND gate" valve or dual pressure valve.

There is also provided a brake control module for installation in an agricultural vehicle, the brake control module comprising:
  first and second inlet ports to receive inputs from first and second master cylinders;
  a brake fluid inlet port to receive brake fluid; and
  first and second outlet ports to output brake fluid to left and right wheel brakes respectively,
  wherein the module further comprises a central selection valve to selectively output brake fluid to the left wheel brake, to the right wheel brake, or to both the left and right wheel brake,
  wherein the operation of the central selection valve is based on the difference in pressure between the received inputs of the first master cylinder and the second master cylinder.

The brake control module is preferably provided as a component which can be installed in an agricultural vehicle having relatively standard components, such as master cylinders, wheel brakes, brake fluid reservoirs, etc., to allow for the vehicle to be configured to have a braking system as described above. Preferably, the brake fluid is arranged to be received from an external brake fluid supply, e.g. utilising a brake fluid pump coupled to a reservoir and/or a brake fluid accumulator.

It will be understood that the brake control module may be provided with further inlets and outlets to allow for the implementation of the different functions and features as described above for the overall braking system, e.g. outlets for connection to a trailer brake and/or a front brake, an inlet/outlet port to allow for supply to and from an accumulator, an outlet to allow for drainage of brake fluid to a brake fluid reservoir, etc. Additionally, the brake control module may be provided with suitable sensor connections for coupling with a vehicle Engine Control System (ECU), for example to monitor brake fluid pressure, to alert on a failure state, etc.

For the fluid coupling of the master cylinders directly to the left and right wheel brakes, it will be understood that the brake control module may be installed in parallel to an existing fluid connection, e.g. when as a retrofit solution for a vehicle having an existing brake system. Additionally or alternatively, the brake control module may be provided with suitable outlet ports coupled to the inlet ports to receive inputs from first and second master cylinders, such that the outlet ports can be used to supply fluid from the first and second master cylinders direct to the left and right wheel brakes.

There is further provided an agricultural vehicle, preferably an agricultural tractor, having a braking system or a brake control module as described above.

There is further provided a method of controlling a braking system for an agricultural vehicle, wherein the method comprises the steps of:
  providing a first master cylinder pressure indicative of a desired left wheel brake action;
  providing a second master cylinder pressure indicative of a desired right wheel brake action;
  providing a brake fluid from a brake fluid supply to be supplied to a left and right wheel brake; and
  supplying the brake fluid to the left wheel brake, to the right wheel brake, or to both the left and right wheel brakes, based on the pressure differential between the first master cylinder pressure and the second master cylinder pressure.

Preferably, the brake fluid from a brake fluid supply is a pressurised brake fluid, preferably from an external brake fluid supply and/or a brake fluid accumulator.

Preferably, the method comprises the further steps of:
  supplying a portion of the first master cylinder pressure as auxiliary brake fluid to a left wheel brake; and
  supplying a portion of the second master cylinder pressure as auxiliary brake fluid to a right wheel brake.

Preferably, the method comprises the step of supplying the brake fluid from the brake fluid supply to the left and/or right wheel brakes when the first master cylinder pressure and the second master cylinder pressure is above a threshold value.

Preferably, the method comprises the steps of:
  when the first master cylinder pressure is substantially greater than the second master cylinder pressure, supplying the brake fluid from the brake fluid supply to the left wheel brake,
  when the second master cylinder pressure is substantially greater than the first master cylinder pressure, supplying the brake fluid from the brake fluid supply to the right wheel brake, and
  when the first master cylinder pressure is substantially equal to the second master cylinder pressure, supplying the brake fluid from the brake fluid supply to both the left wheel brake and the right wheel brake.

It will be understood that the term "central" as used herein is indicative only, and is not intended to be limiting regarding the actual location of the associated component.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
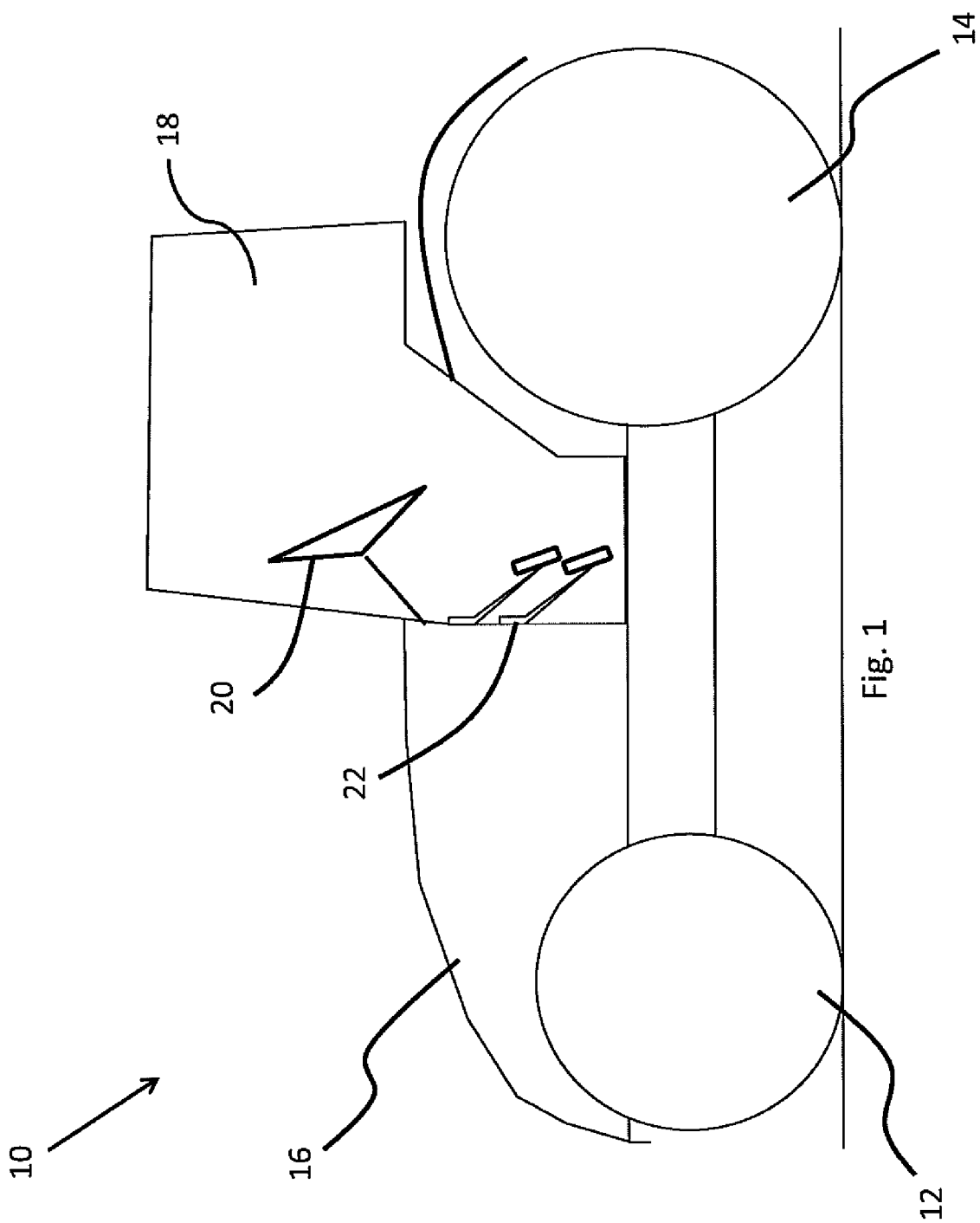
FIG. 1 is an illustration of an agricultural tractor.

With reference to FIG. 1, an agricultural tractor is indicated at 10. The tractor 10 comprises front wheels 12, rear wheels 14, an engine section 16 and a cab section 18. A steering wheel 20 is provided in the cab 18, along with a pair of brake pedals 22. The brake pedals 22 are used to control the braking of the tractor 10, in particular to control the separate braking of the rear wheels 14.

Figure 2:
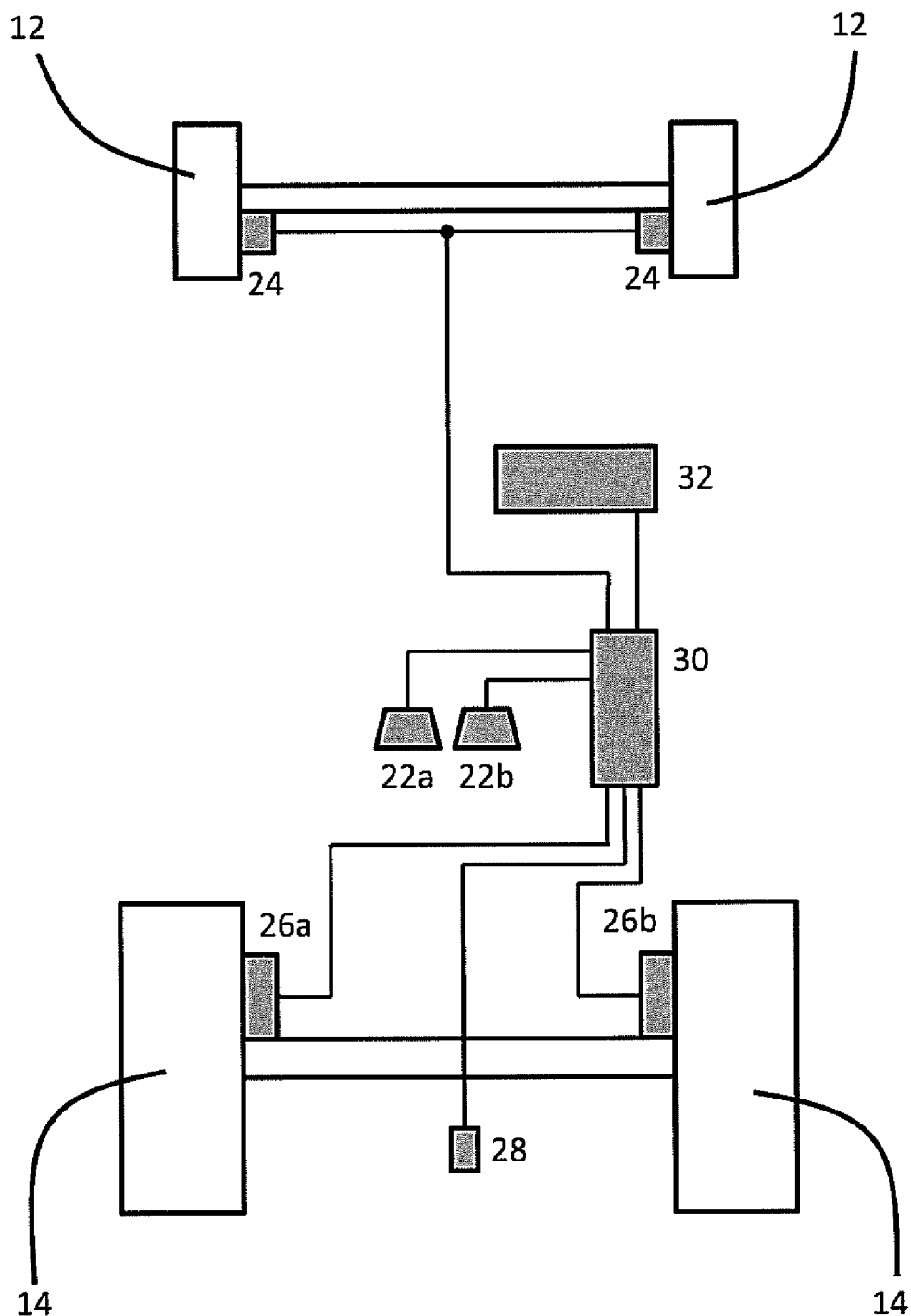
FIG. 2 is a schematic of a tractor having a braking system according to the invention.

FIG. 2 provides an overview of the braking system layout for the tractor 10 of FIG. 1. The front wheels 12 of the tractor 10 are provided with linked front wheel brakes 24, while the rear wheels 14 are provided with separate left and right rear wheel brakes 26a, 26b. The tractor 10 further comprises a trailer brake component 28, which is arranged at the rear of the tractor 10 for connection to the braking system of a linked trailer implement (not shown). While the embodiment of FIG. 2 shows a tractor having a pair of front wheel brakes 24, it will be understood that the invention may also apply to embodiments having a single front wheel brake, to brake both of the front wheels of the tractor.

The braking system comprises a brake control module 30 which is coupled with the brake pedals 22, the respective front wheel brakes 24 and rear wheel brakes 26a,26b, and the trailer brake component 28. The brake control module 30 is further coupled with a supply of brake fluid 32, preferably provided as a pressurised brake fluid supply from an accumulator and/or a pumped brake fluid reservoir.

The brake pedals 22 are arranged such that a left brake pedal 22a is arranged to control the left rear wheel brake 26a, while a right brake pedal 22b is arranged to control the right rear wheel brake 26b. The actuation of the front brakes 24 is linked to the actuation of the left and right pedals 22a, 22b together, while the actuation of the trailer brake component 28 is linked to the actuation of the left brake pedal 22a and/or the right brake pedal 22b to a level which requires braking of a connected trailer.

Figure 3:
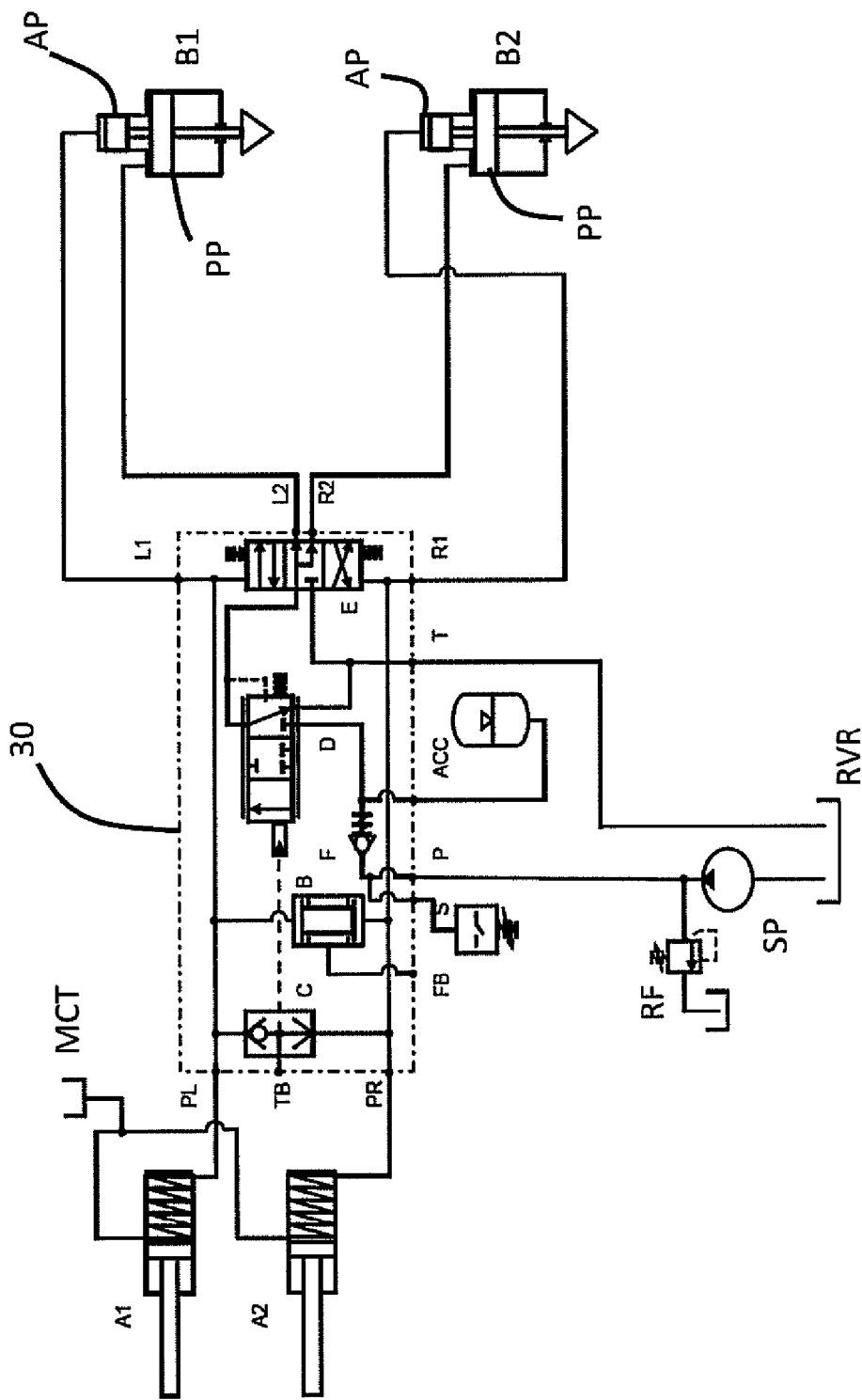
FIG. 3 is a schematic circuit of a braking system according to the invention.

A schematic of a braking system according to an embodiment of the invention is illustrated in FIG. 3. The braking system is provided as a hydraulic system. The brake pedals 22 shown in FIGS. 1 and 2 are coupled to respective hydraulic master cylinders, the left brake pedal 22a acting to drive a first master cylinder A1, and the right brake pedal 22b acting to drive a second master cylinder A2. The fluid output of the first master cylinder A1 is provided in hydraulic line PL, and the fluid output of the second master cylinder A2 is provided in hydraulic line PR.

The separate left and right wheel brakes 26a,26b of FIGS. 1 and 2 are driven by respective hydraulic slave cylinders, the left wheel brake 26a driven by a first hydraulic slave cylinder B1, and the right wheel brake 26b driven by a second hydraulic slave cylinder B2. The first and second slave cylinders B1, B2 each comprise a primary piston PP and an auxiliary piston AP. The primary piston PP of each slave B1, B2 is configured to generate a relatively large breaking force at the respective rear wheel brakes 26a, 26b. The auxiliary piston AP of each slave B1, B2 is connected to and moves with the respective primary piston PP of the slave.

The auxiliary piston AP of the first slave cylinder B1 is driven by the hydraulic line L1, and the auxiliary piston PP of the second slave cylinder B2 is driven by the hydraulic line R1. The primary piston PP of the first slave cylinder B1 is driven by the hydraulic line L2, and the primary piston PP of the second slave cylinder B2 is driven by the hydraulic line R2.

The external brake fluid supply 32 of FIG. 2 is provided in the form of a brake fluid tank or reservoir RVR, which is coupled with a supply pump SP, which is arranged to supply a pumped brake fluid supply along hydraulic line P. The external brake fluid supply 32 further comprises a brake fluid accumulator ACC, coupled with the pumped supply P via a non-return valve F. The use of the supply pump SP combined with the accumulator ACC ensures the provision of a pressurised brake fluid supply for the braking system, but it will be understood that any combination of suitable supply components may be utilised to provide brake fluid supply.

The system comprises a switch coupled to the pumped brake fluid supply line P, where the switch S is operable to detect a fault in the brake fluid supply. The switch S can be arranged to generate a warning signal for a vehicle Engine Control Unit (ECU), and/or to display a warning indicator in a vehicle cabin, displaying a fault in the supply. The supply pump SP is coupled with a safety or relief valve RF, arranged to provide suitable pressure relief in the brake fluid supply when needed.

The first and second master cylinders A1, A2 are supplied from a master cylinder tank MCT, to ensure that sufficient hydraulic fluid is provided in the cylinders A1, A2. The first master cylinder A1 is connected to hydraulic line PL, and the second master cylinder A2 is connected to hydraulic line PR.

PL and PR are used as inputs to an "AND gate" valve B, where the output of the "AND gate" valve B is used as the input for a suitable front brake system FB, such as the front brakes 24 shown in FIG. 2, or a single front wheel brake. Accordingly, when pressure is applied to both the first and second master cylinders A1,A2, which is indicative of an operator actuating both brake pedals 22a,22b, the "AND gate" valve B is actuated, and pressure applied to the front brake system FB to brake the vehicle.

In addition, PL and PR are used as inputs to a shuttle valve C, where the output of the shuttle valve C is used as the input for a suitable trailer brake system TB, such as the trailer brake component 28 shown in FIG. 2. The shuttle valve C acts as an "OR gate", based on the output of the master cylinders A1, A2. Accordingly, when pressure is applied to the first master cylinder A1 and/or to the second master cylinder A2, the shuttle valve C allows for pressure to be supplied to the trailer brake system TB, to generate a braking force for an attached trailer, if present.

The system further comprises a central proportional valve D, and a central selection valve E. It will be understood that the term "central" is not reflective of a positional limitation of the valves.

The central proportional valve D is a directional control valve having a valve inlet, a pair of valve outlets, and a central transitory position. The valve is biased, preferably spring biased, to an at-rest position wherein the outlets may be drained to the brake fluid reservoir RVR via hydraulic line T. The central proportional valve D is actuated by the output of the shuttle valve C, such that an actuation of the first master cylinder A1, or the second master cylinder A2, or both A1 and A2, will result in a corresponding actuation of the central proportional valve D. Once actuated, the central proportional valve D is configured to take as input the pressurised brake fluid supply at P and/or the output of the accumulator ACC, and to output the brake fluid to the central selection valve E.

The central selection valve E is a further directional control valve, having an inlet and a plurality of outlets. Valve E is configured to selectively supply brake fluid from the output of the central proportional valve D to the line L2 to control the primary piston PP of the first slave cylinder B1, or to supply brake fluid to the line R2 to control the primary piston PP of the second slave cylinder B2, or to supply brake fluid to both L2 and R2. The central selection valve E is a three-position directional control valve, which is actuated by both the hydraulic line PL at one side of the valve E and the hydraulic line PR at the opposite side of the valve E. Accordingly, the central selection valve E is controlled by the pressure differential between PR and PL, which translates to the difference in pressure between the first master cylinder A1 and the second master cylinder A2.

It will be understood that when the central proportional valve D is not actuated, no brake fluid is supplied through the central selection valve E to the slave cylinders B1, B2.

When the central proportional valve D is actuated, the central selection valve E is configured such that:

i. when the pressure in PL is greater than the pressure in PR, brake fluid is supplied from the output of the central proportional valve D to the first slave cylinder B1 via line L2, resulting in a braking of the left wheel brake 26a;

ii. when the pressure in PR is greater than the pressure in PL, brake fluid is supplied from the output of the central proportional valve D to the second slave cylinder B2 via line R2, resulting in a braking of the right wheel brake 26b;

iii. when the pressure in PR is substantially equal to the pressure in PL, brake fluid is supplied from the output of the central proportional valve D to both the first and second slave cylinders B1 and B2 via lines L2 and R2, resulting in a braking of the left and right wheel brakes 26a,26b.

The central selection valve E is biased, preferably spring biased, towards a central location wherein an input of valve E from the central proportional valve D is connected to both of the outputs of the valve E, the outputs connected to lines L2 and R2.

It will be understood that the spring biasing strength of the valves D and E may be selected to provide for appropriate response levels of the braking system. For example, the biasing strength of the central proportional valve D may be selected to be a relatively low stiffness, to provide for a relatively fast response time, due to the ease of actuation of the valve D. In addition, the biasing strength, in combination with the use of central transitory positions of the valves may provide for a hysteresis effect in the actuation of the braking system, which can translate into an improved pedal feeling for an operator.

Figure 4:
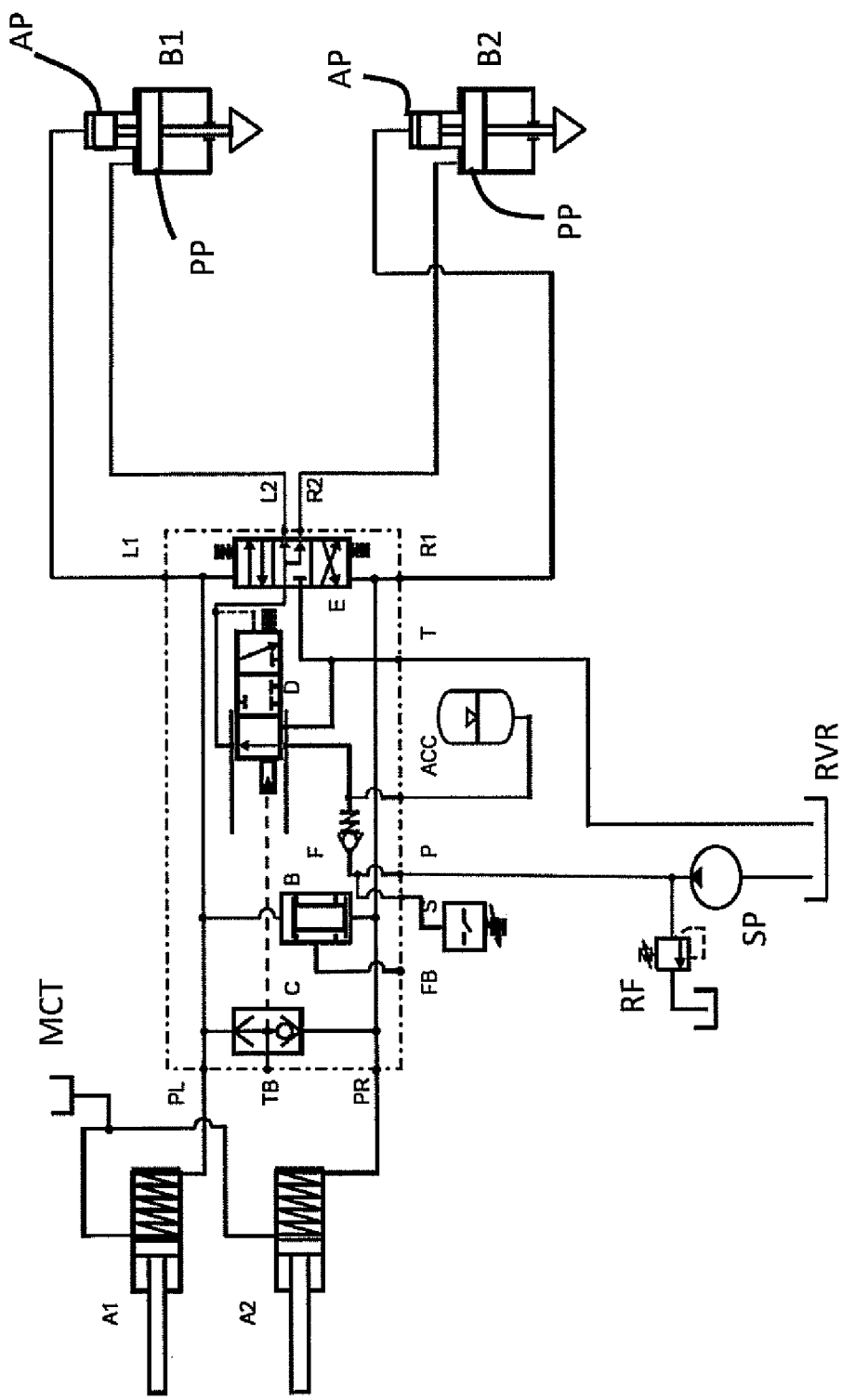
FIG. 4 is a schematic circuit of the system of FIG. 3, when both wheel brakes are actuated.
Figure 5:
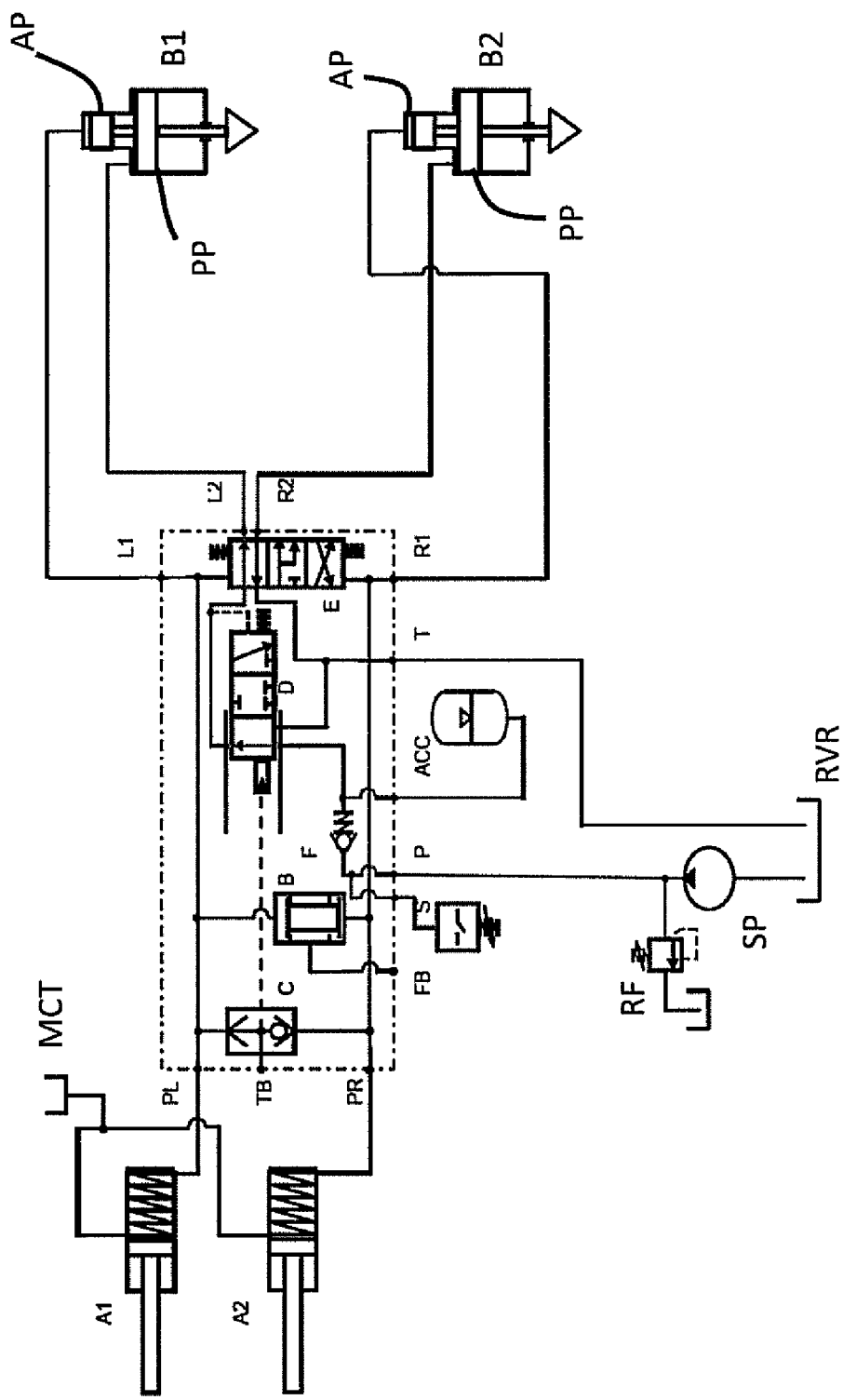
FIG. 5 is a schematic circuit of the system of FIG. 3, when only one wheel brake is actuated.

In FIG. 3, the braking system of the invention is illustrated in an at-rest state, where no pressure is applied to the brake pedals 22a, 22b. Turning to FIGS. 4 and 5, braking system of FIG. 3 is shown for two different operating states.

In the system of FIG. 4, both of the brake pedals 22a, 22b are actuated. Accordingly, both the first and second master cylinders A1, A2 are also actuated, resulting in a relatively high pressure in both lines PL and PR.

As both PL and PR are high, the "AND gate" valve B is actuated, resulting in an activation of the front brake system FB. In addition, pressure at both inputs to the shuttle valve C results in an activation of the trailer brake system TB, as well as actuation of the central proportional valve D. The central proportional valve D is moved to the state wherein brake fluid from the pressurised brake fluid supply P and/or from the accumulator ACC is supplied to the input of the central selection valve E.

As the pressure in PL is substantially equal to the pressure in PR, due to both brake pedals 22a, 22b being actuated, accordingly there is little or no pressure differential across central selection valve E. As a result, the valve E is retained in the central position, wherein brake fluid is supplied from the central proportional valve D to both the first and second slave cylinders B1, B2. The supplied brake fluid actuates the primary pistons PP of the slave cylinders B1, B2, such that a braking force is applied to the left and right wheel brakes 26a, 26b to brake the vehicle.

By contrast, for the system of FIG. 5, only the left brake pedal 22a is actuated, with the right brake pedal 22b remaining unactuated. Accordingly, only the first master cylinder A1 is actuated, resulting in a high pressure applied to line PL only.

When pressure is only applied to one input of the "AND gate" valve B, as a result the front brake system FB is not actuated. As the shuttle valve C effectively operates as an "OR gate", the presence of high pressure at only one input of the valve C results in an actuation of the trailer brake system TB, as well as an actuation of the central proportional valve D. The central proportional valve D is moved to the state wherein brake fluid from the pressurised brake fluid supply P and/or from the accumulator ACC is supplied to the input of the central selection valve E.

For the central selection valve E, as the pressure in PL is greater than the pressure in PR, accordingly the valve E is moved to the position where brake fluid is supplied from the central proportional valve D to only the first slave cylinder B1, via line L2. The supplied brake fluid actuates the primary piston PP of the first slave cylinder B1, such that a braking force is applied to the left wheel brake 26a only, e.g. for a vehicle turning operation.

While FIG. 5 illustrates the operation of the braking system during actuation of the left brake pedal 22a only, it will be understood that actuation of the right brake pedal 22b only results in a similar configuration to the schematic of FIG. 5, but wherein the selection valve E is actuated by the pressure differential between PR and PL to supply brake fluid to the second slave cylinder B2.

The use of an external pressurised brake fluid supply provides for a fast braking response time. In addition, as the slave cylinders are primarily actuated using such fluid from an external supply, accordingly the master cylinders may be of reduced volume. As the external supply, e.g. the fluid reservoir, the accumulator, can be located elsewhere in the tractor construction as opposed to in the tractor cabin itself, this allows for a reduction in the cabin space requirements for the braking system. Furthermore, the use of a braking system wherein brake fluid supply is controlled based on a pressure differential between different master cylinders results in a pressure harmonisation between the left- and right-side braking systems.

In a further embodiment, a safety valve (not shown) may be provided as part of the braking system, the safety valve arranged to connect the lines L2 and R2. The safety valve is preferably an ON/OFF valve, which is arranged to fluidly connect lines L2 and R2 in the event of a failure of the braking system, e.g. a failure in selection valve E. The safety valve would act to balance the pressures between L2 and R2, and may be activated if a failure in the braking system is detected by a vehicle ECU. The safety valve may be controlled as a solenoid valve, having a normally-open operational state.

In a further feature of the braking system, the lines PL and PR are respectively connected to lines L1 and R1, such that the first and second master cylinders A1, A2 are fluidly connected with the auxiliary pistons AP of the respective first and second slave cylinders B1, B2.

In one aspect, this allows for a backup control of the braking system in case of failure of a braking system component, as a limited direct control of the slave cylinders B1,B2 can be achieved by actuation of the respective master cylinders A1,A2, due to the direct connection to the auxiliary pistons AP.

In a further aspect, when either or both of the slave cylinders B1, B2 are actuated by brake fluid supply via L2 and/or R2 to the respective primary pistons PP, the auxiliary pistons AP of the slaves are also actuated. This generates a draw on the respective lines L1 and/or R1, which leads to a fall in pressure in the respective connected lines PL and/or PR. As PL and PR are effectively used to control the central proportional valve D, being used as inputs to shuttle valve C, a fall in the pressure of PL and/or PR will result in the central proportional valve D moving back from the fully actuated position, where brake fluid is supplied to selection valve E.

In a preferred aspect, the biasing of central proportional valve D is configured such that if the master cylinders A1,A2 are released, for example due to pressure no longer being applied to the brake pedals 22a,22b, the central proportional valve D is returned to the at-rest position shown in FIG. 3. In this position, brake fluid is not supplied to the selection valve E, rather any brake fluid in the valve E is allowed to drain through valve D to the reservoir RVR.

Alternatively, if the actuation of the master cylinders A1 and/or A2 is unchanged while the pressure in PL and or PR falls due to actuation of the slave cylinders B1,B2, valve D will return to the central transitory position, thereby preventing the supply of brake fluid to, or the draining of brake fluid from, the central selection valve E. Accordingly, while the pressure in lines PL and/or PR may fall due to the actuation of the auxiliary pistons AP, the slave cylinders B1,B2 will be retained in the position to which they were actuated to, by the initial actuation of the master cylinders A1,A2.

Threshold pressure values for the actuation of the central proportional valve D into the different valve states may be defined by the selection of appropriate biasing strengths of biasing springs used in the braking system.

The brake system module 30 shown in FIG. 2 is indicated by the dashed-line box of FIG. 3. In one embodiment, the brake system module 30 may be provided as a self-contained component suitable for installation to or removal from a tractor 10, the module 30 having appropriate inlet and outlet ports for connection with the components of the brake system shown outside of the box. In such an embodiment, it will be understood that the brake system module 30 is particularly suitable for retrofitting to an existing tractor 10, and/or for removal as part of a service repair or replacement operation.

For example, the hydraulic lines PL,PR,TB,FB,S,P,ACC, T,R1,R2,L1,L2 may be arranged as separate inlet/outlet ports for a self-contained brake system module 30. It will be understood that such an arrangement is provided by way of example, and alternative configurations of inlet/outlet ports may be used. For example, the accumulator ACC and the fluid supply line P may be connected in parallel to a single inlet/outlet port, wherein non-return valve F is arranged external to the self-contained brake system module 30 as part of a separate external brake fluid supply 32.

In an alternative embodiment, the brake system module 30 may be provided as a distributed system, incorporated into the general tractor construction. In this case, the outline 30 of FIG. 3 will be understood to be in no way limiting as to the location of the system components in the tractor construction.

The invention is not limited to the embodiments described herein, and may be modified or adapted without departing from the scope of the present invention.

The invention claimed is:

1. A braking system for an agricultural vehicle, the braking system comprising:
   a first master cylinder associated with a first brake pedal to control a left wheel brake;
   a second master cylinder associated with a second brake pedal to control a right wheel brake;
   a central selection valve to selectively apply brake fluid from a brake fluid supply to the left wheel brake, to the right wheel brake, or to both the left and right wheel brakes, wherein the operation of the central selection valve is based on the difference between the first master cylinder pressure and the second master cylinder pressure; and
   a central proportional valve to supply brake fluid from the brake fluid supply to the central selection valve, the operation of the central proportional valve configured wherein:
      when a pressure of the first and second master cylinders is greater than an upper threshold value, brake fluid is supplied via the central proportional valve to the central selection valve; and
      when the pressure of the first and second master cylinders is less than the upper threshold value, brake fluid is not supplied via the central proportional valve to the central selection valve.

2. The braking system of claim 1, wherein the first master cylinder pressure is used to drive a first side of the central selection valve, and the second master cylinder pressure is used to drive an opposed second side of the central selection valve.

3. The braking system of claim 1 wherein the central selection valve is configured such that:
   when the first master cylinder pressure is substantially greater than the second master cylinder pressure, brake fluid is supplied to the left wheel brake;
   when the first master cylinder pressure is substantially less than the second master cylinder pressure, brake fluid is supplied to the right wheel brake; and
   when the first master cylinder pressure is substantially equal to the second master cylinder pressure, brake fluid is supplied to both the left wheel brake and the right wheel brake.

4. The braking system of claim 1 further comprising a brake fluid reservoir or tank, wherein the central selection valve is configured such that:
   when the first master cylinder pressure is substantially greater than the second master cylinder pressure, the right wheel brake is substantially drained to the brake fluid reservoir; and
   when the first master cylinder pressure is substantially less than the second master cylinder pressure, the left wheel brake is substantially drained to the brake fluid reservoir.

5. The braking system of claim 1 wherein the system is arranged where brake fluid from the brake fluid supply is supplied to the central selection valve when the pressure of the first and second master cylinders is above a threshold value.

6. The braking system of claim 1 wherein the first master cylinder is fluidly coupled with the left wheel brake, with a first slave cylinder coupled to the left wheel brake, and the second master cylinder is fluidly coupled with the right wheel brake, preferably with a second slave cylinder coupled to the right wheel brake.

7. The braking system of claim 1 wherein the central proportional valve is configured wherein:
   when the pressure of the first and second master cylinders is less than the upper threshold value and greater than a lower threshold value, brake fluid is prevented from flowing through the central proportional valve; and
   when the pressure of the first and second master cylinders is less than the lower threshold value, brake fluid is allowed to drain through the central proportional valve to a brake fluid reservoir.

8. The braking system of claim 1 wherein the system further comprises a shuttle valve driven by the first master cylinder pressure and the second master cylinder pressure, wherein the central proportional valve is driven by the output of the shuttle valve.

9. The braking system of claim 8, wherein the output of the shuttle valve is used as the input for a trailer brake system.

10. The braking system of claim 1, further comprising a valve arranged to produce an output for a front brake system, when the valve is driven by pressure at both the first master cylinder and the second master cylinder.

11. An agricultural vehicle comprising a braking system as claimed in claim 1.

12. A brake control module for installation in an agricultural vehicle, the brake control module comprising:
   first and second inlet ports to receive inputs from first and second master cylinders;
   a brake fluid inlet port to receive brake fluid;
   first and second outlet ports to output brake fluid to left and right wheel brakes respectively;
   a central selection valve to selectively output brake fluid to the left wheel brake, to the right wheel brake, or to both the left and right wheel brake, wherein the operation of the central selection valve is based on a difference in pressure between the received inputs of the first and second master cylinders; and a central proportional valve to supply brake fluid from a brake fluid supply to the central selection valve, the operation of the central proportional valve configured wherein:

when a pressure of the first and second master cylinders is greater than an upper threshold value, brake fluid is supplied via the central proportional valve to the central selection valve; and when the pressure of the first and second master cylinders is less than the upper threshold value, brake fluid is not supplied via the central proportional valve to the central selection valve.

13. A method of controlling a braking system for an agricultural vehicle, wherein the method comprises the steps of:

providing a first master cylinder pressure indicative of a desired left wheel brake action;

providing a second master cylinder pressure indicative of a desired right wheel brake action;

providing a brake fluid from a brake fluid supply to be supplied to a left and right wheel brake;

supplying the brake fluid to a left wheel brake, to a right wheel brake, or to both the left and right wheel brakes, based on a pressure differential between the first master cylinder pressure and the second master cylinder pressure;

monitoring a first and second master cylinder pressure;

when the first and second master cylinder pressure is greater than an upper threshold value, supplying brake fluid from the brake fluid supply; and when the first and second master cylinder pressure is less than the upper threshold value, not supplying brake fluid from the brake fluid supply.

* * * * *